UNITED STATES PATENT OFFICE.

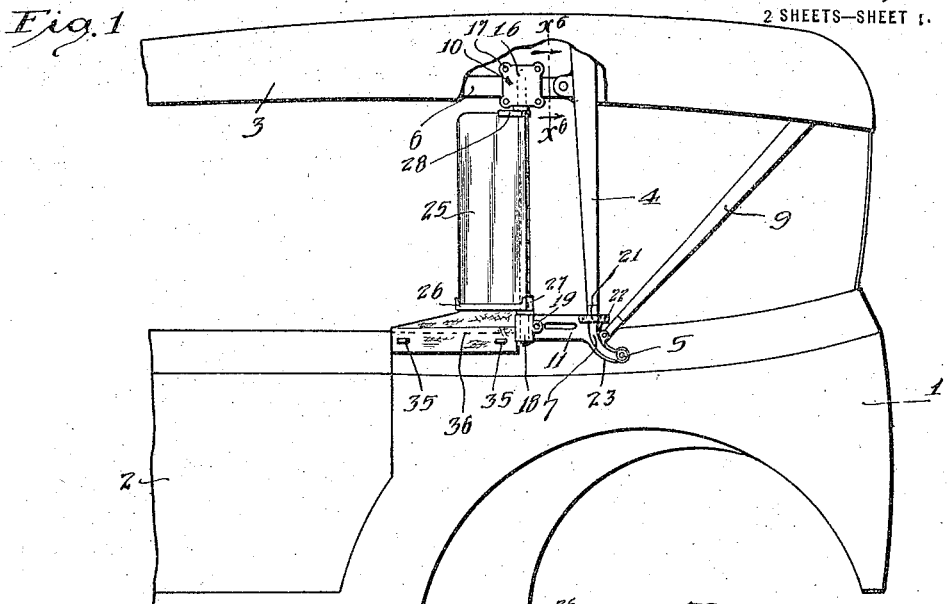
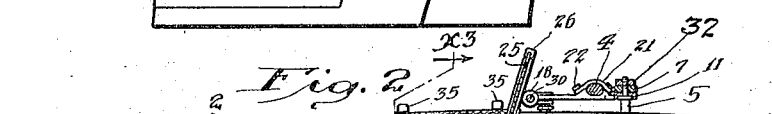
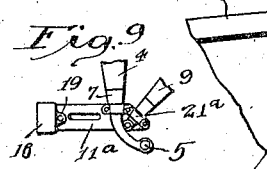
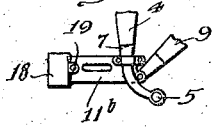
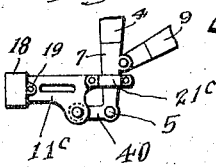
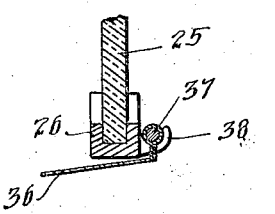

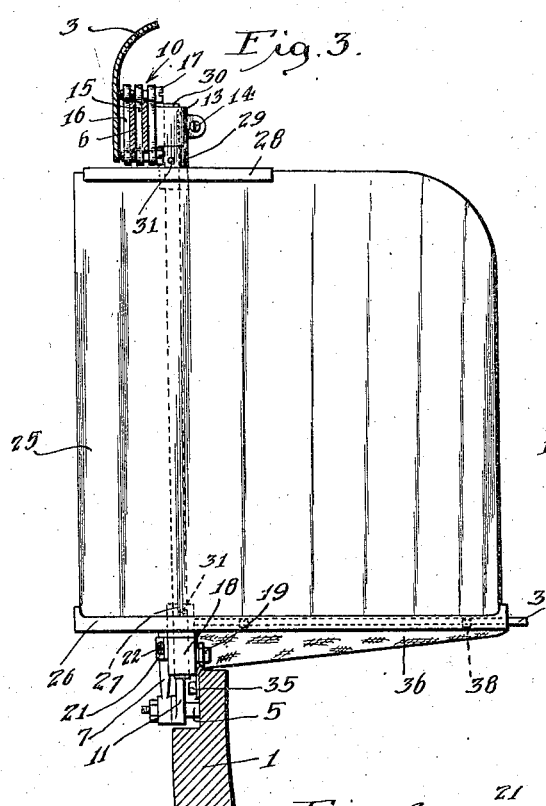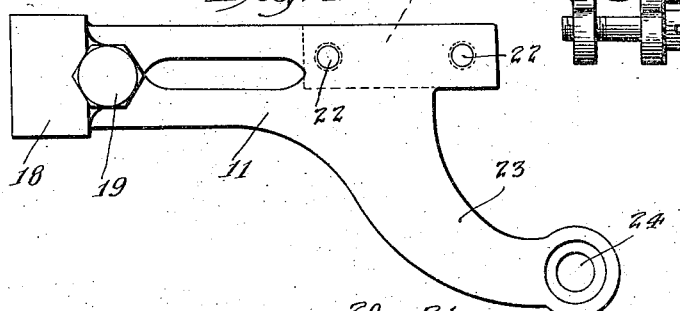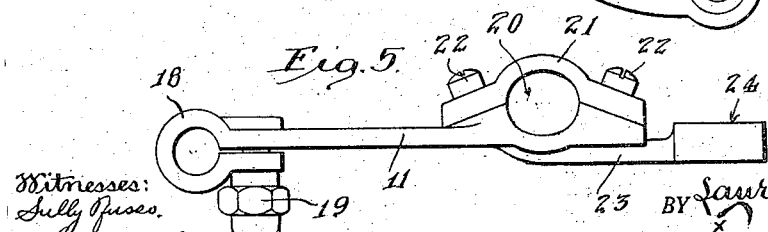

LAURENCE WALTER SWARTS, OF LOS ANGELES, CALIFORNIA.

WINDSHIELD.

1,402,188.  Specification of Letters Patent.  Patented Jan. 3, 1922.

Application filed December 3, 1919. Serial No. 342,115.

*To all whom it may concern:*

Be it known that I, LAURENCE W. SWARTS, a citizen of the United States, residing at Los Angeles, county of Los Angeles, State of California, have invented a new and useful Windshield, of which the following is a specification.

This invention relates to windshields of the type adapted for use on automobiles and more particularly is directed to tonneau windshields serving to deflect wind currents from the machine.

The object of the invention is to provide a tonneau windshield as a detachable device adapted to be attached to component parts of standard types of automobiles without alteration of or addition to said parts.

Another object is to provide a vertically pivoted tonneau windshield journaled in opposed bearing brackets each detachably secured to component parts of the automobile rearwardly of the tonneau door.

A further object is to provide a windshield of the above described type having a wind deflecting skirt attached to the body of the car and detachably supported at the bottom of the windshield.

Another object is to provide a tonneau windshield journaled in opposed brackets, the top bracket detachably secured to the horizontal rail of the top and the lower bracket detachably secured to the hinge bracket of the top bow.

Various other objects and advantages will be more fully apparent from the following description of the accompanying drawings forming a part of this disclosure and which illustrate a preferred form of embodiment of the invention.

Of the drawings:

Figure 1 is a partial side elevation of a car with my improved windshield attached thereto, and partly broken away to disclose the top journal bracket.

Fig. 2 is a plan section.

Fig. 3 is an enlarged section on line $x^3$—$x^3$ of Fig. 2.

Fig. 4 is an enlarged detailed elevation of one of the lower journal brackets.

Fig. 5 is an enlarged detailed plan view of one of the lower journal brackets.

Fig. 6 is an enlarged section on line $x^6$—$x^6$ of Fig. 1.

Fig. 7 is a side elevation of the bracket shown in Fig. 6.

Fig. 8 is a section similar to Fig. 6, showing a modified form of journal bracket adapted for attachment to an oval horizontal top rail.

Fig. 9 is an elevation of a portion of the top bows and a modified form of lower journal bracket.

Fig. 10 is a similar elevation showing a second modified form of lower journal bracket.

Fig. 11 shows a third modification of said bracket adapted for use on Ford automobiles.

Fig. 12 is an enlarged detail section on line $x^{12}$—$x^{12}$ of Fig 2.

Referring to Figures 1 to 7 of the drawings, and primarily to Figures 1 and 2, the body 1 is provided with the tonneau side doors 2, and the top 3 has a transverse top bow 4 pivoted on opposite sides of the body on pivot studs 5—5. Horizontal rails 6—6 extend forwardly from the upper portion of the top bow 4, these being shown in Figures 3 and 6 as spaced parallel bars, while in Figure 8 the rail is shown as being of oval stock. In practice, the top bows of standard automobile tops are made of hollow tubular stock joined at their opposed ends to solid metal brackets 7—7. Each of said brackets has an ear which connects to the rear top bow 9.

The means for pivotally supporting each tonneau windshield consists of a top journal bracket 10 and a lower journal bracket 11. The journal bracket 10, as shown in Figures 3, 6 and 7, is adapted for attachment with the two part horizontal top rail and comprises an inner plate having a vertical split journal bearing 13 provided with a clamp screw 14, an intermediate spacer plate 15, and an outer plate 16, each plate having relatively alined screw orifices, with the orifices of the plate 16 screw-threaded for engagement by clamp screws 17.

The lower journal bracket 11, (see Figs. 4-5) is formed to provide a vertical split journal bearing 18, provided with a clamp screw 19, and a vertical concave seat 20. A clamp strap 21 extends across said seat and is secured in place upon the bracket 11 by screws 22—22. Projecting rearwardly and downwardly is an arm 23 having a transverse orifice 24 adapted to engage over the pivot stud 5.

The windshield proper comprises a glass plate 25 supported by a channeled base bar 26 having a laterally projected boss 27, and a channeled top bar 28 having a similar boss 29. A pivot rod 30 extends through vertical bores in said bosses and projects beyond each boss, with the bosses secured to the rod by transverse pins 31—31, or otherwise.

In attaching the windshield to the machine, the top bow 4 is detached from the studs 5—5 and the lower journal bracket 11 is positioned on the stud 5 with said stud projecting through the orifice 24 of the arm 23. The top bow is next replaced on the stud 5 and the bracket 11 positioned so that the concave seat 20 thereof engages the vertical shank of the bow bracket 7, the strap 21 then being placed in position and the screws 22—22 tightened to secure the bracket 11 to the bow bracket 7, after which the standard bow clamping nut 32 is tightened to clamp the top bow and bracket 11 in position on the pivot stud 5.

The windshield is next placed in position with the lower projected end of the pivot rod 30 positioned in the bearing 18 of the bracket 11 with the boss 27 resting on top of said bearing.

The journal bracket 10 is positioned with the upper projected end of the rod 30 engaged in the journal bearing 13. The intermediate spacing plate 15 is positioned between the two members of the horizontal top rail 6, the outer plate 16 on the outside of the rail and the entire bracket clamped in position by the clamp screws 17.

Fastening devices 35—35, of any desired specific type are positioned on the outer surface of the body, as shown in Figures 1 and 2 and are adapted to detachably secure one edge of a triangular wind deflecting skirt 36 to the body. The skirt is formed of flexible material, such as leather oilcloth or any standard automobile curtain material, and the opposite edge thereof is secured to a rod 37 which rests in pocket grooves formed in ears 38—38 which project laterally from the rear side of the lower base bar 26 of the windshield. The rod 37 is preferably secured to the edge of the skirt 36 by being projected through a hem in the edge thereof, with one end projecting beyond the inner edge of the windshield as a hand grip.

With the device assembled as above explained the clamp screws 14 and 19 of the upper and lower split bearings 13 and 18 are tightened to provide sufficient clamping tension on the pivot rod 30 to hold the windshield against displacement by wind pressure.

This clamping tension need not be excessive. because the pressure exerted on the major inner portion of the glass on one side of its vertical axis of rotation is counterbalanced by that which is exerted on the more exposed minor outer portion of the glass which extends on the opposite side of said axis.

When desiring to get out of the tonneau, the passenger first raises the rod 37 of the skirt 36 out of the socket grooves in the cars 38—38 and allows the skirt to drop down free of the windshield. The inner end of the windshield can now be moved rearwardly to a position parallel with the side of the car and just inside the top bow 4.

The modified form of upper journal bracket shown in Fig. 8 comprises only an outer plate and an inner journal plate both having inner faces contoured to fit a one piece top rail.

Figure 9 shows a lower journal bracket 11ª which is clamped to the both top bows by a clamp strap 21ª.

In Figure 10 a lower journal bracket 11ᵇ is clamped to the vertical top bow as previously explained in connection with the bracket 11, but instead of being also secured on the stud 5, is secured at the pivot of the rear top bow.

In Figure 11 is shown a further modification illustrating a bracket 11ᶜ especially adapted for Ford machines and which is clamped to the vertical top bow by a strap 21ᶜ and is also connected to an ear 40 projecting forwardly from the top supporting stud 5.

Having described my invention, I claim:

1. A windshield combining an upper journal bracket adapted for securing to the horizontal rail of a vehicle top, a lower journal bracket adapted for securing to a vertical bow of the top, and a wind deflecting panel member vertically hinged in said brackets.

2. A windshield combining an upper journal bracket adapted for securing to the horizontal rail of a vehicle top, a lower journal bracket adapted for securing to a vertical bow of the top, and a wind deflecting panel member vertically hinged in said brackets, and laterally extending on opposite sides of its axis of rotation.

3. A windshield combining upper and lower journal brackets adapted for securing to a vehicle top in spaced relation and having relatively alined journal-bearings, and a wind deflecting panel member vertically hinged in said bearings and laterally extended on opposite sides of its axis of rotation.

4. A windshield combining an upper journal bracket, a lower journal bracket, a wind deflecting member, a base bar supporting said member, a top bar engaging the top edge of said member, a pivot rod fixed to both bars and journaled in the brackets.

5. A windshield combining an upper journal bracket having a vertical journal bearing, a lower journal bracket having a vertical journal bearing, a transverse orifice and a vertically disposed seat, a wind deflecting member journaled in the journal bearings of both brackets, and a strap removably secured to the lower bracket and extending across said seat.

6. A windshield combining an upper journal bracket adapted for securing to the horizontal rail of a vehicle top, a lower journal bracket adapted for securing to a vertical bow of the top, a wind deflecting member vertically journaled in said brackets, and a wind deflecting skirt removably supported on the wind deflecting member near its bottom edge.

7. A windshield combining an upper journal bracket adapted for securing to the horizontal rail of a vehicle top, a lower journal bracket adapted for securing to a vertical bow of the top, a wind deflecting member vertically journaled in said brackets and laterally extending on opposite sides of its axis of rotation, and a wind deflecting skirt removably supported on the wind deflecting member near its bottom edge.

8. A windshield combining upper and lower journal brackets adapted for securing to a vehicle top in spaced relation and having relatively alined journal bearings, a wind deflecting member vertically journaled in said bearings and laterally extended on opposite sides of its axis of rotation, and a wind deflecting skirt removably supported on the wind deflecting member near its bottom edge.

9. A windshield combining an upper journal bracket having a vertical journal bearing, a lower journal bracket having a vertical journal bearing, a transverse orifice and a vertically disposed seat, a wind deflecting member journaled in the journal bearings of both brackets, a strap removably secured to the lower bracket and extending across said seat, and a wind deflecting skirt removably supported on the wind deflecting member near its bottom edge.

10. A windshield combining an upper journal bracket adapted to be attached to a vehicle top, a lower journal bracket adapted to be attached to the lower portion of a vehicle top bow, a wind deflecting member, a base bar supporting said member, a top bar engaging the top edge of said member, a pivot rod fixed to both bars and journaled in the brackets, and a wind deflecting skirt removably supported on said base bar.

11. A tonneau windshield combining relatively spaced journal brackets adapted for securing to a vehicle top rearwardly of the tonneau door, a wind deflecting member vertically journaled in said brackets, and a wind deflecting skirt detachably supported by said member and removably attached to the outer surface of the vehicle body rearwardly of the tonneau door.

12. A windshield combining an upper journal bracket adapted for securing to the horizontal rail of a vehicle top, a lower journal bracket adapted for securing to the pivot bracket of the top, and a wind deflecting panel member vertically hinged in said journal brackets.

13. A windshield combining an upper journal bracket adapted for securing to the horizontal rail of a vehicle top, a lower journal bracket adapted to be supported upon the pivot stud of the top and for securing to the pivot bracket thereof, and a wind deflecting panel member hinged in said journal brackets.

14. A windshield combining an upper journal bracket adapted for attachment to a vehicle top, a lower journal bracket adapted for attachment to the lower portion of a vehicle top bow, and a wind deflecting member vertically hinged in both brackets.

Signed at Los Angeles, California, this 26th day of November, 1919.

LAURENCE WALTER SWARTS.

Witnesses:
CLARENCE B. FOSTER,
L. BELLE WEAVER.